No. 767,205. PATENTED AUG. 9, 1904.
E. G. CAUGHEY.
PUNCHING AND RIVETING MACHINE.
APPLICATION FILED NOV. 21, 1903.
NO MODEL. 2 SHEETS—SHEET 2.
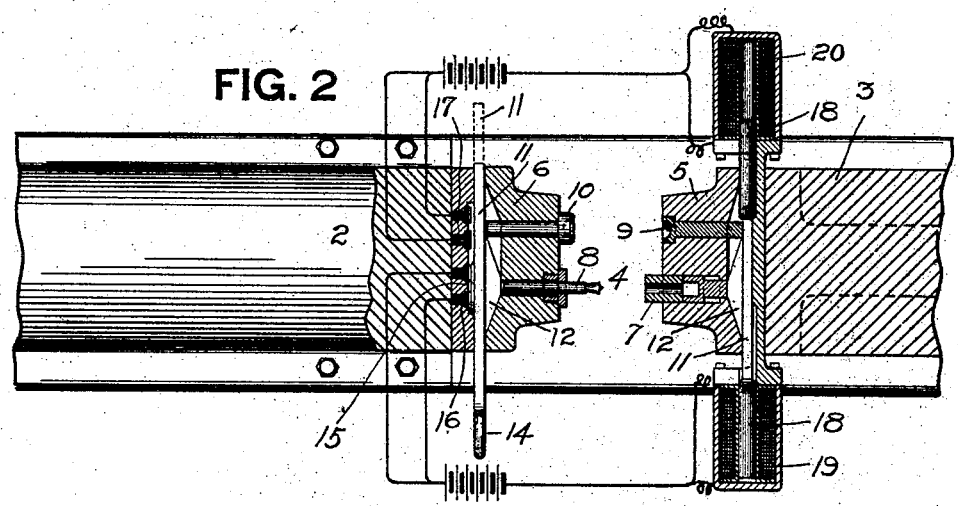
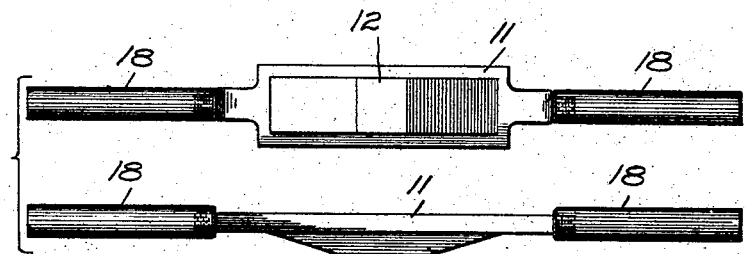
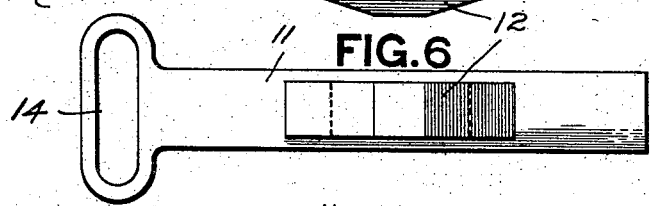
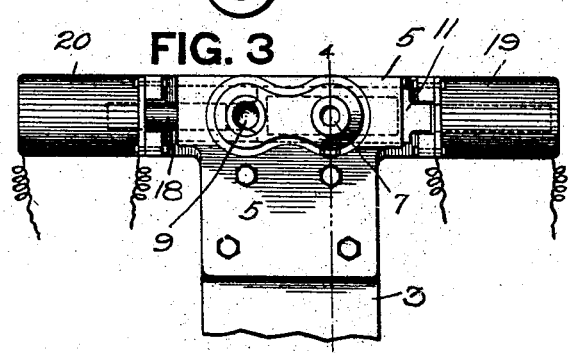
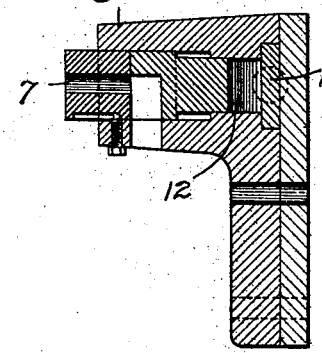
WITNESSES. INVENTOR.

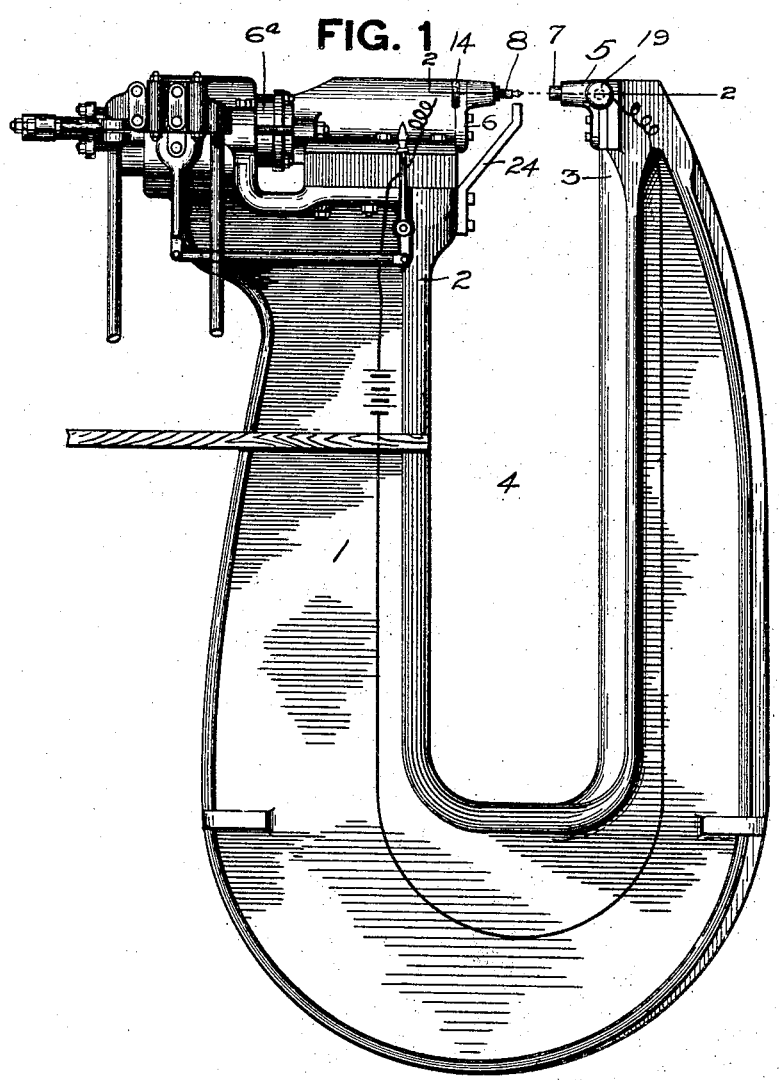

No. 767,205.

Patented August 9, 1904.

UNITED STATES PATENT OFFICE.

EDWARD G. CAUGHEY, OF BUTLER, PENNSYLVANIA.

PUNCHING AND RIVETING MACHINE.

SPECIFICATION forming part of Letters Patent No. 767,205, dated August 9, 1904.

Application filed November 21, 1903. Serial No. 182,116. (No model.)

*To all whom it may concern:*

Be it known that I, EDWARD G. CAUGHEY, a resident of Butler, in the county of Butler and State of Pennsylvania, have invented a new and useful Improvement in Punching and Riveting Machines; and I do hereby declare the following to be a full, clear, and exact description thereof.

My invention relates to metal punching and riveting machines; and its object is to provide a combined machine for both punching and riveting metal.

In the manufacture of built-up metallic structures—such as bridge-girders, car sides, and the like—it is the custom to lay off each bar, plate, or other piece of the structure separately, center-punch the same, and then punch the holes therethrough. The several pieces are then assembled, carried off to another part of the shop, and riveted together. This procedure not only makes necessary a large amount of work in laying out the pieces and center-punching and punching the holes, but also necessitates the moving of the material from one place in the shop to another, and with heavy structures—such as bridge-girders, car sides, and the like—this handling is quite expensive. Furthermore, much annoyance arises from the fact that the holes in the several pieces may not accurately match or register with each other. To obviate this, the custom is to ream out the holes by hand. This is an expensive and slow operation and also results in long or oblong holes, so that the rivets frequently do not contain sufficient material to properly fill these enlarged holes and at the same time leave enough material for a complete head.

The object of my invention is to provide a suitable machine for both punching and riveting the work, thereby overcoming the several defects above specified and also largely reducing the cost of the work.

The invention consists, generally stated, in providing a single machine with a pair of punching-dies and also a pair of riveting-dies, together with actuating mechanism in common for both of said dies, so that the work can be both punched and riveted in the same machine and without the necessity of moving it from one place in the shop to another.

In the accompanying drawings, Figure 1 is a side view of my machine. Fig. 2 is a horizontal section on the line 2 2, Fig. 1. Fig. 3 is a front view of the stationary tools. Fig. 4 is a vertical section on the line 4 4, Fig. 3. Fig. 5 shows two views of the sliding plate in the stationary head, and Fig. 6 is a front view of the sliding plate in the movable head.

My invention is applicable to any form of punching or riveting machine or to any form of frame therefor. In the drawings it has been shown in connection with the frame of a deep-gap-riveting machine, this frame, however, having been selected for purposes of illustration merely.

The frame shown in the drawings comprises a casting 1 of general U shape having the arm 2, on which are mounted the movable dies and their actuating mechanism, and the arm or stake 3, carrying the stationary dies, these arms being separated by the gap 4 for receiving the work. The stationary dies are mounted in the head 5, secured to the stake 3, while the movable dies are mounted in a head 6, guided on the arm 2 of the frame. This movable head may be actuated by any suitable mechanism, such as the hydraulic cylinder $6^a$, the latter, however, having been selected for purposes of illustration merely.

In the heads 5 and 6 are mounted a pair of punching-dies and a pair of riveting-dies, these dies being so mounted that either pair can be thrown out of operation or gear while the other pair is in operation, so as not to obstruct the passage or handling of the work being riveted or punched. In the stationary head 5 is mounted the punching-die 7, and in the movable head 6 is mounted the coöperating punch 8. In the stationary head there is also mounted one of the riveting-dies 9, while in the movable head is mounted the coöperating riveting-die 10. These dies and punches are mounted in the heads, so that they can be either retracted to throw them out of operation or else projected to throw them into operation. Various means for so retracting and projecting the dies may be employed. As shown in the drawings, in each of the heads 5 and 6 back of the dies is a sliding plate 11, having thereon a swelling or projection 12, provided with slanting or sloping side faces, and of such length that it will engage only one of the dies at a time and of sufficient height to fully project the dies and hold the same in operative position. These sliding plates can be operated by any suitable means or mechanism, either by hand, foot, compressed air, or electric power. As shown in the drawings, the plate 11 in the movable head 6 is provided with a handle 14, whereby it may be moved so as to either push or pull the plate 11 to bring the projection or swelling 12 behind the punch 8 or behind the riveting-die 10.

It is essential that the reversing means or plates 11 in both heads be operated simultaneously, so as to obviate the danger of throwing out the riveting-die on one side and the punch on the other side. Suitable connecting means will therefore be provided between the plates 11 in the two heads, so that the movement of one of said plates will also cause a movement of the other in the same direction. Various forms of connecting means for this purpose may be employed, either mechanical, pneumatic, or electrical. The means for this purpose shown in the drawings is electric. The sliding plate 11 in the movable head 6 is provided with a circuit-closing contact-strip 15, which is arranged to bridge either the terminals 16 or the terminals 17, depending upon the position of said plate. To each end of the movable plate 11 of the stationary head is attached a metallic piece 18, which pieces form, respectively, cores of solenoids 19 and 20, attached to the stationary head on opposite sides thereof. Suitable circuit-wires connect the terminals 16 with one of the solenoids—say the solenoid 19—while other wires connect the terminals 17 with the other solenoid, 20. As a consequence, when the reversing-plate 11 in the movable head is in position to hold the punch 8 projected the contact-plate 15 thereon will bridge the terminals 16, thus energizing the solenoid 19 and drawing the plate 11 of the stationary head over to the position to hold the punching-die 7 projected. Vice versa, when the plate 11 of the movable head is moved in such a position that the projection 12 thereon will hold the riveting-die 10 projected the contact-plate 15 will bridge the terminals 17, thus energizing the solenoid 20 and causing the same to draw the plate 11 of the stationary head in the opposite direction, so as to hold the coöperating punching-die 9 projected. It will thus be seen that the reversing mechanism is such that both members of coöperating dies will be held in operative position while both members of the other pair of dies will be in inoperative position, thus permitting the one pair of dies to act on the work and the other to be out of the way, so as not to interfere with the passage of the work between the dies.

The machine will be provided with convenient stripper-bars 24, which may be varied in shape and location to the machine upon which they are used and which will serve to prevent the material from being carried back by the punch after the hole has been pierced. If desired, both the heads 5 and 6 may be movable.

Various changes in the details of the construction might be made without departing from the spirit of my invention.

In the use of my machine in case it is desired to unite two or more plates, bars, or the like it will be necessary to lay off and center-punch only one of these pieces. These pieces being suitably secured together are passed between the heads 5 and 6, and then by means of the punch shown the holes will be pierced at the points laid out. There is therefore a great saving in the time necessary to lay out the work and center-punch the same, and the output of the punching-machine is also greatly increased from the fact that all of the pieces—whether two, three, or more—are pierced at a single stroke of the punch, while with the ordinary way of doing this work it would require as many punching-strokes as there are pieces to be punched. The punching and riveting of all the holes is accomplished by the one machine and without the necessity of moving the work from one place in the shop to another, thus giving a great saving in the handling of the material and also increasing the output for a certain floor-space.

It is also evident that by means of my machine the holes through two or more pieces of material must necessarily aline or match, thus doing away with the annoyance heretofore arising from the separate punching and also doing away with the expensive and slow hand-reaming that has heretofore been resorted to in order to get the holes to match. Furthermore, the riveting with my machine is far superior to that under the old procedure for the reason that the punched holes not having to be reamed out will not be so large, but that the rivets will contain sufficient material to entirely fill the holes and at the same time leave enough for complete heads.

What I claim is—

1. In a combined punching and riveting machine, the combination of coöperating punching-dies, coöperating riveting-dies, a movable head in which one of each pair of said dies is mounted, means for actuating said head, and means for rendering one of the dies in said head operative and simultaneously rendering the other die in said head inoperative.

2. In a combined punching and riveting machine, the combination of a head carrying a punching-die and a riveting-die, a second head carrying a coöperating punching-die and a coöperating riveting-die, mechanism for causing relative to-and-fro motion of said heads, and means arranged to move one pair of said dies into operative position and simultaneously render the other pair of said dies inoperative.

3. In a combined punching and riveting machine, the combination of coöperating punching-dies, coöperating riveting-dies, heads in which said dies are mounted, mechanism for causing relative to-and-fro motion of said heads, and a movable member in one of said heads provided with a projection of such size as to engage only one of the dies in said head and hold the same projected.

4. In a combined punching and riveting machine, the combination of coöperating punching-dies, coöperating riveting-dies, heads in which said dies are mounted, a sliding backing-plate in one of said heads and provided with a projection of such size as to engage only one of the dies in said head, hand-controlled means for sliding said backing-plate, and mechanism for causing relative to-and-fro motion of said heads.

5. In a combined punching and riveting machine, the combination of coöperating punching-dies, coöperating riveting-dies, mechanism for rendering either of said pair of dies operative and the other pair of said dies inoperative, and actuating mechanism common to both pairs of dies.

6. In a combined punching and riveting machine, the combination of coöperating punching-dies, coöperating riveting-dies, means arranged to move one pair of said dies into operative position and simultaneously rendering the other pair of said dies inoperative, and actuating mechanism common to both pairs of dies.

7. In a combined punching and riveting machine, the combination of coöperating punching-dies, coöperating riveting-dies, heads in which said dies are mounted, and a movable backing-piece in each of said heads, said backing-pieces each having a projection of such size as to engage only one of the dies in each head.

8. In a combined punching and riveting machine, the combination with a pair of heads, mechanism for moving one of said heads, a punching-die and a riveting-die mounted in one of said heads, a coöperating punching-die and riveting-die mounted in the other of said heads, and a movable member in each head provided with a projection for engaging only one of the dies in the head and holding the same projected.

9. In a combined punching and riveting machine, the combination of a pair of heads, mechanism for causing said heads to move toward and from each other, a punching-die and riveting-die slidably mounted in each head, a sliding backing-plate in each head and provided with a projection arranged to engage one of said dies only and hold the same projected, and solenoids for moving said plates.

10. In a combined punching and riveting machine, the combination of coöperating punching-dies, coöperating riveting-dies, a pair of heads in which said dies are mounted, means for rendering one of the dies in one head inoperative, means for rendering one of the dies in the other head inoperative, connections between said means whereby they operate simultaneously, and mechanism for causing relative to-and-fro motion of said heads.

11. In a combined punching and riveting machine, the combination of two heads, means for moving said heads toward and from each other, a punching-die and a riveting-die slidably mounted in each head, a movable plate in each head provided with means for engaging one of said dies and holding the same projected, means for moving one of said plates, and connections between said plate and the other plate whereby when the one plate is moved the other will also be moved.

12. In a combined punching and riveting machine, the combination of a pair of heads, means for moving said heads toward and from each other, a punching-die and a riveting-die movably mounted in each head, movable means in each head arranged to engage said dies and hold the one projected, a circuit-closer connected to one of said movable means, an electromagnet or magnets connected to the other of said movable means, and circuit-wires connected to said electromagnets and controlled by said circuit-closer.

13. In a combined punching and riveting machine, the combination of a pair of heads, means for moving said heads toward and from each other, a punching-die and a riveting-die slidably mounted in each head, a movable backing-plate in each head provided with a projection for engaging one of said dies and holding the same projected, an electric-circuit controller connected to one of said plates, and a magnet or magnets connected to the other of said plates and being controlled by said circuit-controller.

14. In a combined punching and riveting machine, the combination of a pair of heads, means for moving said heads toward and from each other, a punching-die and a riveting-die slidably mounted in each head, a sliding backing-plate in each head provided with a swelling arranged to engage one of the dies and hold the same projected, operating means for one of said plates, a circuit-closing portion carried by said plate, two pairs of circuit-terminals in position to be bridged by said circuit-closer in the two positions of said plate, a pair of solenoids connected to the sliding plate in the other head, and circuit-wires leading from each pair of said circuit-terminals to said solenoids respectively.

In testimony whereof I, the said EDWARD G. CAUGHEY, have hereunto set my hand.

EDWARD G. CAUGHEY.

Witnesses:
ROBT. D. TOTTEN,
G. C. RAYMOND.